US00RE49744E

(19) United States
(12) Reissued Patent
Park et al.

(10) Patent Number: US RE49,744 E
(45) Date of Reissued Patent: Dec. 5, 2023

(54) LAUNDRY TREATING APPARATUS

(71) Applicant: LG ELECTRONICS INC., Seoul (KR)

(72) Inventors: Jiyoung Park, Seoul (KR); Jiyeon Min, Seoul (KR); Ayeong Lee, Seoul (KR); Sogkie Hong, Seoul (KR)

(73) Assignee: LG ELECTRONICS INC., Seoul (KR)

(21) Appl. No.: 16/150,465

(22) Filed: Oct. 3, 2018

Related U.S. Patent Documents

Reissue of:
(64) Patent No.: 9,309,618
Issued: Apr. 12, 2016
Appl. No.: 14/332,161
Filed: Jul. 15, 2014

U.S. Applications:
(63) Continuation of application No. 15/950,943, filed on Apr. 11, 2018, now Pat. No. Re. 48,205, which is an application for the reissue of Pat. No. 9,309,618.

(30) Foreign Application Priority Data

Jul. 17, 2013 (KR) ..... 10-2013-0083997

(51) Int. Cl.
*D06F 58/10* (2006.01)
*D06F 67/00* (2006.01)
(Continued)

(52) U.S. Cl.
CPC ..... *D06F 58/10* (2013.01); *D06F 67/005* (2013.01); *D06F 71/30* (2013.01); *D06F 73/02* (2013.01)

(58) Field of Classification Search
CPC ..... D06F 73/00; D06F 73/02; D06F 58/10; D06F 58/12; D06F 58/14; D06F 81/06; D06F 67/005; D06C 7/00; A47K 10/48
See application file for complete search history.

(56) References Cited

U.S. PATENT DOCUMENTS 1,882,214 A 10/1932 Etten
3,117,704 A * 1/1964 McMillan ..... 223/73
(Continued)

FOREIGN PATENT DOCUMENTS

CN 1037557 11/1989
CN 2123546 12/1992
(Continued)

OTHER PUBLICATIONS https://www.dictionary.com/browse/between (Year: 2022).*
(Continued)

*Primary Examiner* — Terrence R Till
(74) *Attorney, Agent, or Firm* — KED & ASSOCIATES, LLP

(57) ABSTRACT

A laundry treating apparatus is provided. The laundry treating apparatus may include a cabinet having a receiving space in which laundry is received, a supply device supplying at least one of air or moisture into the receiving space, and a presser provided in the receiving space, the presser including a support device to support the laundry and a compression device to compress the laundry supported by the support device to form a crease in the laundry.

14 Claims, 7 Drawing Sheets

(51) Int. Cl.
*D06F 71/30* (2006.01)
*D06F 73/02* (2006.01)

(56) References Cited

U.S. PATENT DOCUMENTS

| | | | | |
|---|---|---|---|---|
| 3,203,122 | A * | 8/1965 | Sweatt | 38/104 |
| 3,397,472 | A * | 8/1968 | Topliffe | 38/104 |
| 4,493,160 | A | 1/1985 | Brembilla | |
| 5,305,484 | A * | 4/1994 | Fitzpatrick et al. | 8/149.3 |
| 5,474,216 | A * | 12/1995 | Harrod et al. | 223/57 |
| 5,815,961 | A * | 10/1998 | Estes et al. | 38/14 |
| D597,272 | S | 7/2009 | Auguste | |
| 7,603,801 | B2 * | 10/2009 | Jiang et al. | 38/104 |
| 2002/0195914 | A1 * | 12/2002 | Albaizar et al. | 312/314 |
| 2009/0064530 | A1 | 3/2009 | Moon et al. | |
| 2009/0241269 | A1 | 10/2009 | Yoo et al. | |
| 2012/0018461 | A1 | 1/2012 | Azizian | |
| 2013/0097896 | A1 * | 4/2013 | Moon et al. | 38/102 |

FOREIGN PATENT DOCUMENTS

| | | | |
|---|---|---|---|
| CN | 2126854 | | 2/1993 |
| CN | 1170061 | | 1/1998 |
| CN | 1170061 | A | 1/1998 |
| CN | 1081702 | | 3/2002 |
| CN | 1346921 | | 5/2002 |
| CN | 1729332 | | 2/2006 |
| CN | 201738157 | | 2/2011 |
| CN | 201738157 | U | 2/2011 |
| CN | 104294529 | | 1/2015 |
| CN | 108193464 | | 7/2020 |
| DE | 2017394 | | 10/1971 |
| EP | 0 253 048 | | 1/1988 |
| EP | 0 324 589 | | 7/1989 |
| EP | 0 816 552 | | 1/1998 |
| EP | 0 816 552 | A2 | 1/1998 |
| EP | 1 159 893 | | 12/2001 |
| EP | 2 322 707 | | 5/2011 |
| EP | 2 322 707 | A1 | 5/2011 |
| EP | 2 826 911 | | 1/2015 |
| EP | 2 889 426 | | 7/2015 |
| JP | 47-034352 | | 5/1971 |
| JP | S50-085866 | | 7/1975 |
| JP | 53-075638 | | 11/1976 |
| JP | 54-181183 | | 6/1978 |
| JP | S63-82700 | | 4/1988 |
| JP | S 63-82700 | A | 4/1988 |
| JP | H01-274799 | | 11/1989 |
| JP | H 01-274799 | A | 11/1989 |
| JP | H05-068795 | | 3/1993 |
| JP | 10-080331 | | 3/1998 |
| JP | 11-128598 | | 5/1999 |
| JP | 2000-051585 | | 2/2000 |
| JP | 2000-051585 | A | 2/2000 |
| JP | 2002-177698 | | 6/2002 |
| KR | 10-2001-0113436 | | 12/2001 |
| KR | 10-0444005 | | 11/2004 |
| KR | 10-2008-0078367 | | 8/2008 |
| KR | 10-2011-0048344 | | 11/2009 |
| KR | 10-2010-0067780 | | 6/2010 |
| KR | 10-2011-0021167 | | 3/2011 |
| KR | 10-2012-0078278 | | 7/2012 |
| KR | 10-2012-0091799 | | 8/2012 |
| KR | 10-2013-0017029 | | 2/2013 |
| KR | 30-0704405 | | 8/2013 |
| WO | WO 02/052087 | | 7/2002 |
| WO | WO 02/052087 | A1 | 7/2002 |
| WO | WO 2008/007200 | | 1/2008 |

OTHER PUBLICATIONS

Japanese Office Action dated Aug. 9, 2018 issued in JP Application No. 2017-532881.
Japanese Notice of Allowance dated Jul. 2, 2019 issued in JP Application No. 2017-532881.
Korean Office Action dated Mar. 26, 2019 issued in KR Application No. 10-2019-0014938.
Korean Office Action dated Apr. 30, 2019 issued in KR Application No. 10-2013-0150441.
European Search Report dated Jun. 2, 2015 issued in Application No. 14195999.9.
Chinese Office Action dated Dec. 3, 2015 issued in Application No. 201410340593.6.
Chinese Office Action dated May 5, 2016 issued in Application No. 201410736887.0 (English translation attached).
Extended European Search Report issued in European Application No. 15201190.4 dated Apr. 22, 2016, 11 pages.
International Search Report and Written Opinion in International Application No. PCT/KR2015/014024, dated Apr. 20, 2016, 9 pages.
United States Office Action dated Feb. 24, 2017 issued in U.S. Appl. No. 14/974,050.
United States Office Action dated Aug. 10, 2015 issued in U.S. Appl. No. 14/332,161.
United States Office Action dated Aug. 4, 2020 issued in co-pending related U.S. Appl. No. 16/150,401.
Definition of "clip" from :// /www.lexico.com/definition/clip (Year: 2020).
United States Office Action dated May 27, 2020 issued in U.S. Appl. No. 16/150,515.
Korean Notice of Allowance dated Jun. 16, 2020 issued in KR Application No. 10-2020-0021152.
Japanese Office Action dated Sep. 15, 2020 issued in JP Application No. 2019-142078.
Korean Office Action dated May 25, 2021 issued in Application No. 10-2020-0118935.
European Search Report dated Nov. 21, 2014 issued in Application No. 14 176 862.2.

* cited by examiner

FIG. 3A
(Amended)
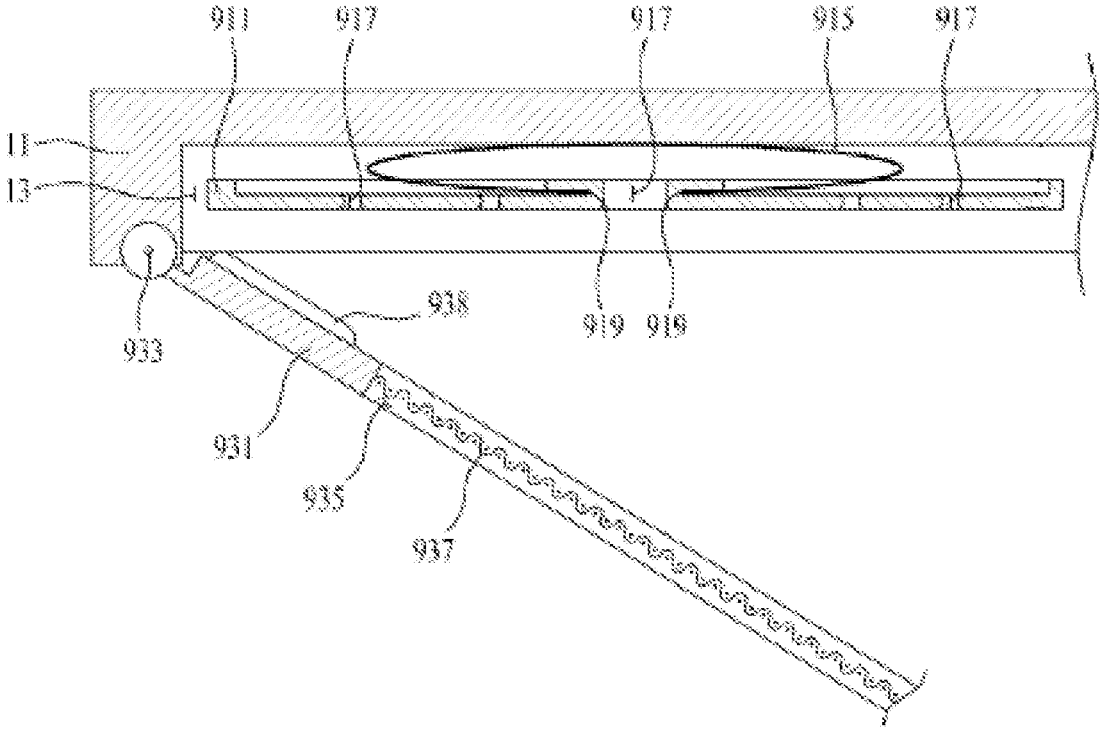

LAUNDRY TREATING APPARATUS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION(S)

[This application] *Notice: More than one reissue application has been filed for the reissue of U.S. Pat. No. 9,309,618 B2. The reissue applications are U.S. Reissue patent application Ser. Nos. 16/150,515 (and now issued as U.S. Pat. No. RE49,038), 16/150,465 (the present reissue application), and 16/150,401 (and now issued as U.S. Pat. No. RE48,481), each filed on Oct. 3, 2018, each of which is a continuation reissue application of U.S. Reissue patent application Ser. No. 15/950,943 (and now issued as U.S. Pat. No. RE48,205), filed on Apr. 11, 2018, which is a reissue application of U.S. patent application Ser. No. 14/332,161, filed Jul. 15, 2014, now U.S. Pat. No. 9,309,618 issued Apr. 12, 2016, which* claims priority under 35 U.S.C. § 119 to Korean *Patent* Application No. 10-2013-0083997 filed on Jul. 17, 2013, whose entire disclosure is hereby incorporated by reference.

BACKGROUND

1. Field

This relates to a laundry treating apparatus.

2. Background

A laundry treating apparatus may perform various operations such as, for example, washing, drying, deodorization, wrinkle removal, and the like related to laundry. Such a laundry treating apparatus may include a washer that washes laundry, a dryer that dries wet laundry, and a refresher that deodorizes laundry or removes wrinkles from the laundry.

BRIEF DESCRIPTION OF THE DRAWINGS

The embodiments will be described in detail with reference to the following drawings in which like reference numerals refer to like elements wherein:

FIGS. 3A and 3B are top and side views of a presser of the laundry treating apparatus shown in FIGS. 1 and 4.

DETAILED DESCRIPTION

Reference will now be made in detail to various embodiments, examples of which are illustrated in the accompanying drawings. It should be noted herein that construction of an apparatus, which will hereinafter be described, and a control method of the apparatus are given only for illustrative purposes and embodiments are not limited thereto.

Wherever possible, the sane reference numbers will be used throughout the drawings to refer to the same or like parts.

A laundry treating apparatus may be capable of washing, drying, and deodorizing laundry and removing wrinkles from the laundry, but may still utilize a drum to receive laundry and a driving device to rotate the drum, with deodorization of laundry or removal of wrinkles from the laundry performed during rotation of the drum. If the laundry is placed in the drum while it is still wrinkled/not straightened, deodorization of laundry and/or removal of wrinkles from the laundry may be adversely affected. Furthermore, such a laundry treating apparatus does not include a device which may form a crease in a laundry item, requiring further treatment by, for example, an iron, after completion of washing or drying.

Figure 1:
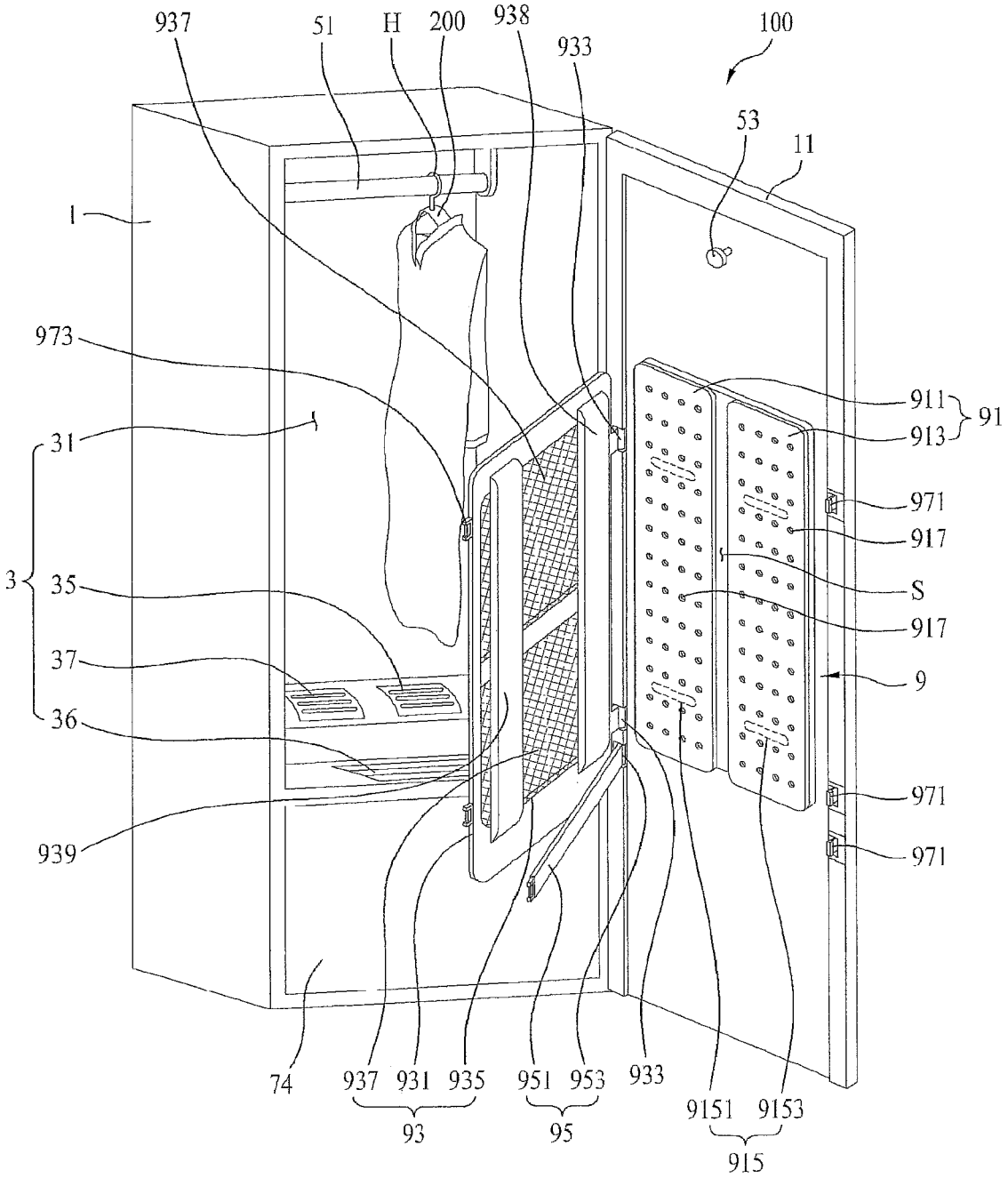
FIGS. 1 and 4 are perspective views of a laundry treating apparatus, FIG. 4 showing the apparatus of FIG. 1 in operation, according to embodiments as broadly described herein.

As shown in FIG. 1, a laundry treating apparatus 100 as embodied and broadly described herein may include a cabinet 1, a laundry receiving device 3 provided in the cabinet 1, a supply device to supply at least one of air or moisture to the laundry receiving device 3, and a presser 9 provided in the laundry receiving device 3.

The laundry receiving device 3 forms a receiving space 31 defined in the cabinet 1 to receive laundry. The receiving space 31 may be opened and closed by a door 11 provided at the cabinet 1.

A laundry support device to support laundry items may be provided in the cabinet 1. The laundry support device may include a laundry support bar 51 (hereinafter, referred to as a 'first laundry support bar') provided in the receiving space 31 and a laundry support bar 53 (hereinafter, referred to as a 'second laundry support bar') provided at the door 11.

The first laundry support bar 51 may extend in a width direction of the receiving space 31 (a width direction of the door) or in a depth direction of the receiving space 31. In the exemplary embodiment shown in FIG. 1, the first laundry support bar 51 extends in the width direction of the receiving space 31.

In this case, laundry may be supported by the first laundry support bar 51 via engagement with a hook H provided on a hanger 200 on which laundry items are received. Alternatively, the laundry may be directly supported by the first laundry support bar 51, without the hanger 200. In any case, the laundry items may be spread in the receiving space 31 for treatment.

The second laundry support bar 53 provided at the door 11 may also keep the laundry in a spread state by supporting the hook H of the hanger 200. Alternatively, the second laundry support bar 53 may extend in the width direction of the door 11 such that the laundry may be directly supported by the second laundry support bar 53 without the hanger 200.

A machinery compartment 7 may be provided in the cabinet 1, isolated from the receiving space 31. The supply device may be provided in the machinery compartment 7.

Figure 2A:
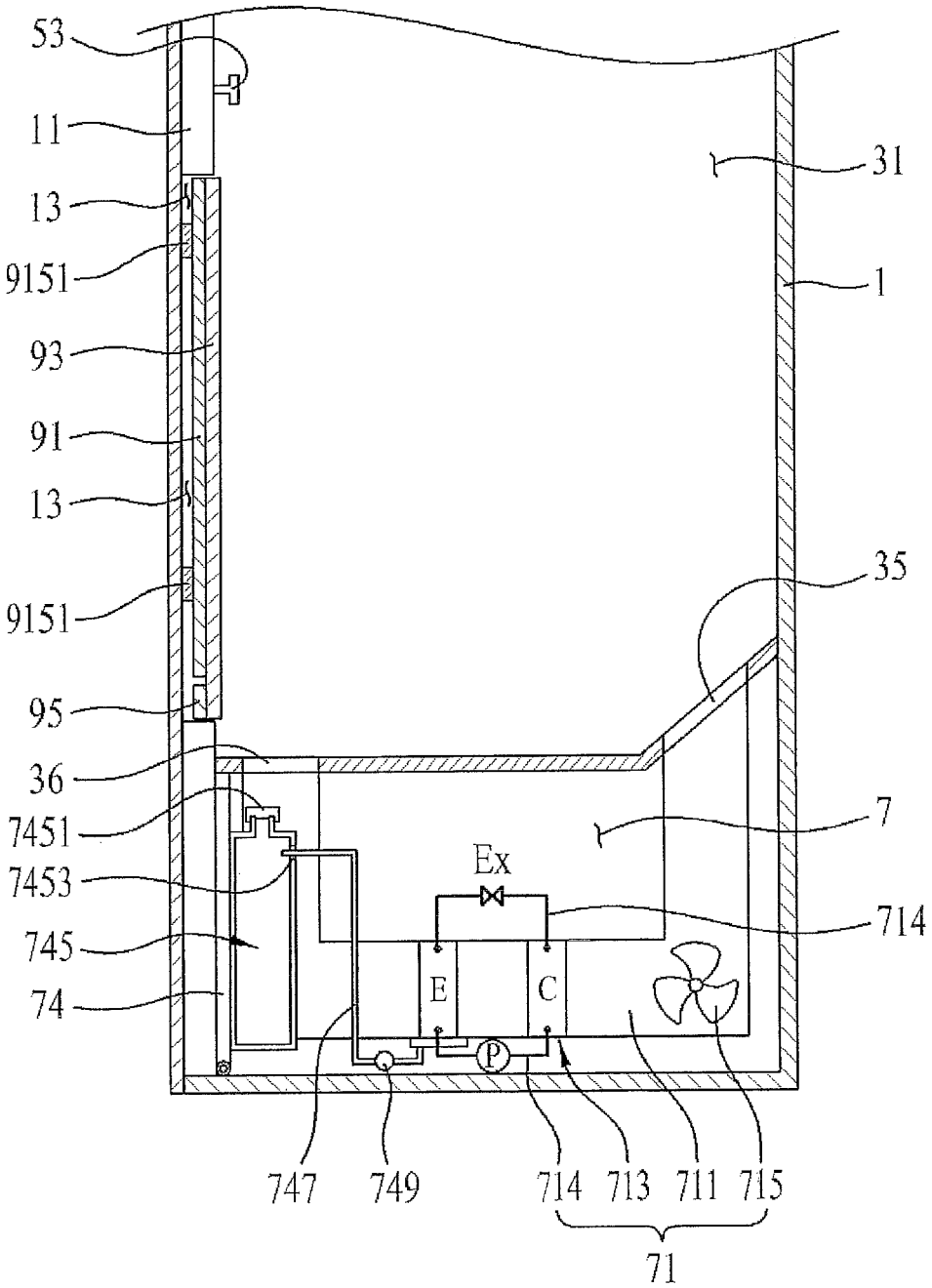
FIGS. 2A and 2B are side sectional views of the laundry treating apparatus shown in FIG. 1.

As shown in FIG. 2, the machinery compartment 7 may be disposed under the receiving space 31, and may be opened and closed by a machinery compartment door 74. In a case in which air or moisture to be supplied to the receiving space 31 by the supply device is heated air or steam, the heated air or the steam may be uniformly supplied into the receiving space 31 without an additional blower. The supply device may include at least one of an air supply device 71 to supply air (heated air or unheated air) to the receiving space 31 and/or a moisture supply device 72 to supply moisture (steam or mist) to the receiving space 31.

Hereinafter, a description will be provided of a laundry treating apparatus 100, as embodied and broadly described herein, based on a case in which the supply device includes both the air supply device 71 and the moisture supply device 72 and the air supply device 71 supplies heated air to the receiving space 31 and the moisture supply unit 72 supplies steam to the receiving space 31, simply for convenience of description.

The air supply device 71 may include a circulation duct 711 to circulate air in the receiving space 31, a heat exchanger 713 to exchange heat with air flowing along the circulation duct 711, and a blower 715 to blow air along the circulation duct 711 and into the receiving space 31.

The circulation duct 711 communicates with the interior of the receiving space 31 through an air discharge port 35 and an air suction port 36 provided in the receiving space 31. The air discharge port 35 and the air suction port 36 may be formed through the bottom of the receiving space 31 such that the receiving space 31 may communicate with the machinery compartment 7 through the air discharge port 35 and the air suction port 36. In a case in which one end of the circulation duct 711 provided in the machinery compartment 7 is connected to the air suction port 36 and the other end of the circulation duct 711 is connected to the air discharge port 35, the circulation duct 711 may communicate with the interior of the receiving space 31.

Figure 3B:
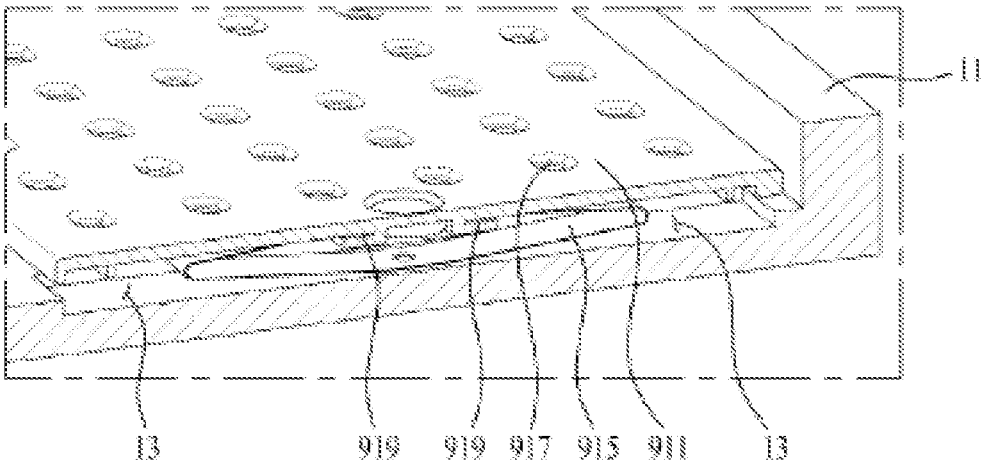

The heat exchanger 713 may dehumidify and heat air introduced into the circulation duct 711. In FIGS. 3A-3B, a heat pump is provided as an example of the heat exchanger 713. In a case in which the heat exchanger 713 is a heat pump, the heat exchanger 713 may include an evaporator E provided in the circulation duct 711, a condenser C disposed inside the circulation duct 711, and a compressor P and an expansion device Ex disposed outside the circulation duct 711. The evaporator E, the compressor P, the condenser C, and the expansion device Ex may be connected to one another via a refrigerant pipe 714.

The compressor P may compress a refrigerant to a high pressure such that the refrigerant may be circulated along the refrigerant pipe 714. The evaporator E may absorb heat from air in the circulation duct 711 to evaporate the refrigerant. The condenser C may discharge heat to air in the circulation duct 711 to condense the refrigerant.

The blower 715 may be disposed in the circulation duct 711 to circulate air in the receiving space 31 through the circulation duct 711. The blower 715 may be disposed between the condenser C and the air discharge port 35.

When the blower 715 is driven, air in the circulation duct 711 moves into the receiving space 31 through the air discharge port 35 and air in the receiving space 31 moves into the circulation duct 711 through the air suction port 36. The air introduced into the circulation duct 711 through the air suction port 36 is cooled while passing though the evaporator E. The air having passed through the evaporator E is heated while passing through the condenser C.

When the air is cooled while passing through the evaporator E, moisture is removed from the air (dehumidification) and the moisture (condensed water) removed from the air remains on the surface of the evaporator E or in the circulation duct 711.

In a case in which the condensed water remains in the circulation duct 711, heat exchange efficiency of the heat exchanger 713 is lowered. For this reason, the laundry treating apparatus 100 may include a drainage device to remove the condensed water produced by the evaporator E.

The drainage device may include a drainage tank 745 detachably provided at the machinery compartment door 74 and a drainage pipe 747 and a drainage pump 749 to supply condensed water in the circulation duct 711 to the drainage tank 745.

The shape of the drainage tank 745 is not particularly restricted so long as the drainage tank 745 provides a space to store liquid. For example, the drainage tank 745 may include a drainage tank lid 7451 to discharge liquid stored in drainage tank 745 and an inlet port 7453 to which the drainage pipe 747 is detachably connected.

A check valve may be provided in the inlet port 7453 such that the drainage pipe 747 is separated from the inlet port 7453 when the machinery compartment door 74 opens the machinery compartment 7, and the drainage pipe 747 is inserted into the inlet port 7453 when the machinery compartment door 74 closes the machinery compartment 7. Water in the drainage tank 745 may also be prevented from leaking out of the drainage tank 745 when the drainage tank 745 is separated from the machinery compartment door 74.

Figure 2B:
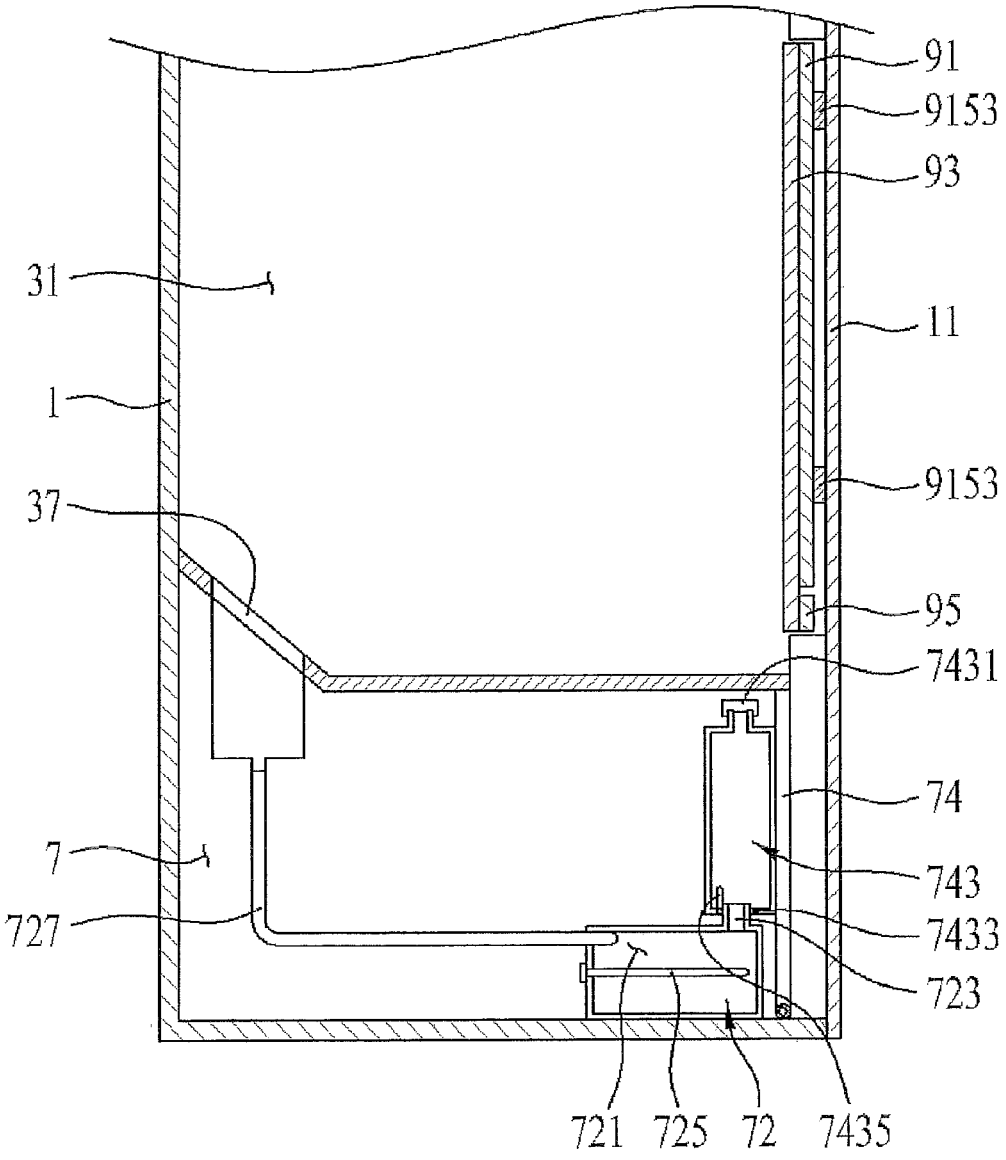

As shown in FIG. 2B, the moisture supply device 72 may include a storage device 721 provided in the machinery compartment 7, a heater 725 provided in the storage. device 721, and a moisture supply pipe 727 to connect the storage device 721 to a moisture discharge port 37.

The storage device 721 may store water, the heater 725 may heat water stored in the storage device 721 to convert the water into steam, and the moisture supply pipe 727 may guide steam from the storage device 721 to the receiving space 31. Consequently, the heater 725 may be provided adjacent to the bottom of the storage device 721 and the moisture supply pipe 727 may be disposed at the top (or the uppermost end) of the storage device 721.

Water is supplied to the storage device 721 through a water supply device. The water supply device may include a water supply tank 743 detachably provided at the machinery compartment door 74.

The storage device 721 may also include a connection pipe 723, which is connected to the water supply tank 743 when the machinery compartment door 74 closes the machinery compartment 7 and is separated from the water supply tank 743 when the machinery compartment door 74 opens the machinery compartment 7.

The shape of the water supply tank 743 is not particularly restricted as long as the water supply tank 743 is capable of storing liquid. For example, the water supply tank 743 may include a water supply tank lid 7431 to supply liquid into the water supply tank 743, an outlet port 7433 into which the connection pipe 723 is inserted, and a check valve 7435 provided in the outlet port 7433.

The water supply tank 743 may be detachably provided at the machinery compartment door 74, taking into consideration a case in which the laundry treating apparatus 100 according to the current embodiment is installed remotely from a water supply source.

That is, in a case in which the laundry treating apparatus 100 is provided adjacent to the water supply source, the storage device 721 may receive water from the water supply source when necessary. On the other hand, in a case in which the laundry treating apparatus 100 is installed remotely from the water supply source, water cannot be directly supplied, so the water supply tank 743 may provide for a supply of water to the moisture supply device 72.

Rather than supplying heated water or steam into a drum during rotation of the drum to deodorize laundry or remove wrinkles from the laundry, the laundry treating apparatus 100 according to embodiments as broadly described herein supplies heated water or steam into the receiving space 31 while keeping laundry in a straight, spread out manner in the receiving space 31, thereby preventing the laundry from being wrinkled after the supply of steam or heated water is completed.

The presser 9 shown in FIG. 1 may fix a crease in laundry received in the receiving space using steam and heated water supplied to the receiving space 31.

The presser 9 may be provided at any position in the receiving space 31 as long as the steam and/or the heated water supplied into the receiving space 31 can be supplied to laundry. FIG. 1 shows a case in which the presser 9 is provided at the inner circumferential surface of the door 11 (the surface of the door forming one surface of the receiving space 31) by way of example.

The presser 9 may include a support device 91 provided at the inner circumferential surface of the door 11 to support laundry and a compression device 93 rotatably provided at the support device 91 or the door 11 to compress the laundry supported by the support device 91.

The compression device 93 may include a body 931 rotatably coupled the inner circumferential surface of the door 11 or the support device 91 and a mesh 937 provided at the body 931 to guide the steam or the heated water introduced into the receiving space 31 to the laundry supported by the support device 91.

FIG. 1 shows a case in which the body 931 is coupled to the door 11 by a body hinge 933 provided at an inner peripheral surface of the door 11. An end of the body 931 opposite the hinged end may be detachably fixed to the inner surface of the door 11 by attaching and detaching device 971 and 973.

The attaching and detaching devices 971 and 973 may include a protrusion 971 provided at one of the door 11 or the body 931 and a receiving groove 973 provided at the other of the door 11 or the body 931 such that each protrusion 971 may be detachably coupled into a corresponding receiving groove 973.

The body 931 may include a body through hole 935 allowing the support device 91 *to* communicate with the receiving space 31. The mesh 937 may be provided in the body through hole 935, which is formed through the body 931.

The support device 91 may include a support plate fixed to the inner circumferential surface of the door 11, received in a presser receiving groove 13 depressed in the inner surface of the door 11.

The support plate may include a first support plate 911 and a second support plate 913 spaced apart from each other by a predetermined distance although in certain embodiments the support plate may be a single plate or board.

The support device 91 includes the first support plate 911 and the second support plate 913 such that a seam of a laundry item supported on this support device 91 may be positioned in a space S defined between the first support plate 911 and the second support plate 913 to prevent unnecessary wrinkles from being formed on the laundry due to the seam when the laundry is compressed toward the support device 91 by the compression device 93.

The first support plate 911 and the second support plate 913 may include through holes 917 formed through the respective support plates 911 and 913. The surfaces of the respective support plates 911 and 913 may be spaced apart from the surface of the presser receiving groove 13 by a predetermined distance. As a result, heated air or steam supplied through the mesh 937 may pass through the laundry supported by the respective support plates 911 and 913 and then be discharged into the receiving space 31.

The support device 91 may also include an elastic member 915 to fix the respective support plates 911 and 913 to the presser receiving groove 13 such that the laundry supported by the respective support plates 911 and 913 may come into tight contact with the body 931 of the compression device 93 in a state in which the respective support plates 911 and 913 are spaced apart from the surface of the presser receiving groove 13 by the predetermined distance.

In a case in which the support device 91 includes both the first support plate 911 mid the second support plate 913, the elastic member 915 may include a first elastic body 9151 to connect the first support plate 911 to the presser receiving groove 13 and a second elastic body 9153 to connect the second support plate 913 to the presser receiving groove 13.

The shape of the elastic member 915 is not particularly restricted as long as the elastic member 915 is capable of performing this function. In FIGS. 3A and 3B, the elastic member 915 have a board or plate shape, by way of example.

That is, the elastic member 915 shown in FIGS. 3A and 3B may be a leaf spring formed by bending opposite ends of a metal plate toward the middle of the metal plate, by way of example. In this case, the middle of the leaf spring is fixed to the presser receiving groove 13 and the free ends of the leaf spring are fixed to the respective support plates 911 and 913.

Fixing grooves 919, into which the free ends of the leaf spring are inserted, may be further provided at the rear surfaces of the respective support plates 911 and 913 facing the presser receiving groove 13 such that the elastic member 915 may be easily coupled to the support plates 911 and 913.

Figure 4:
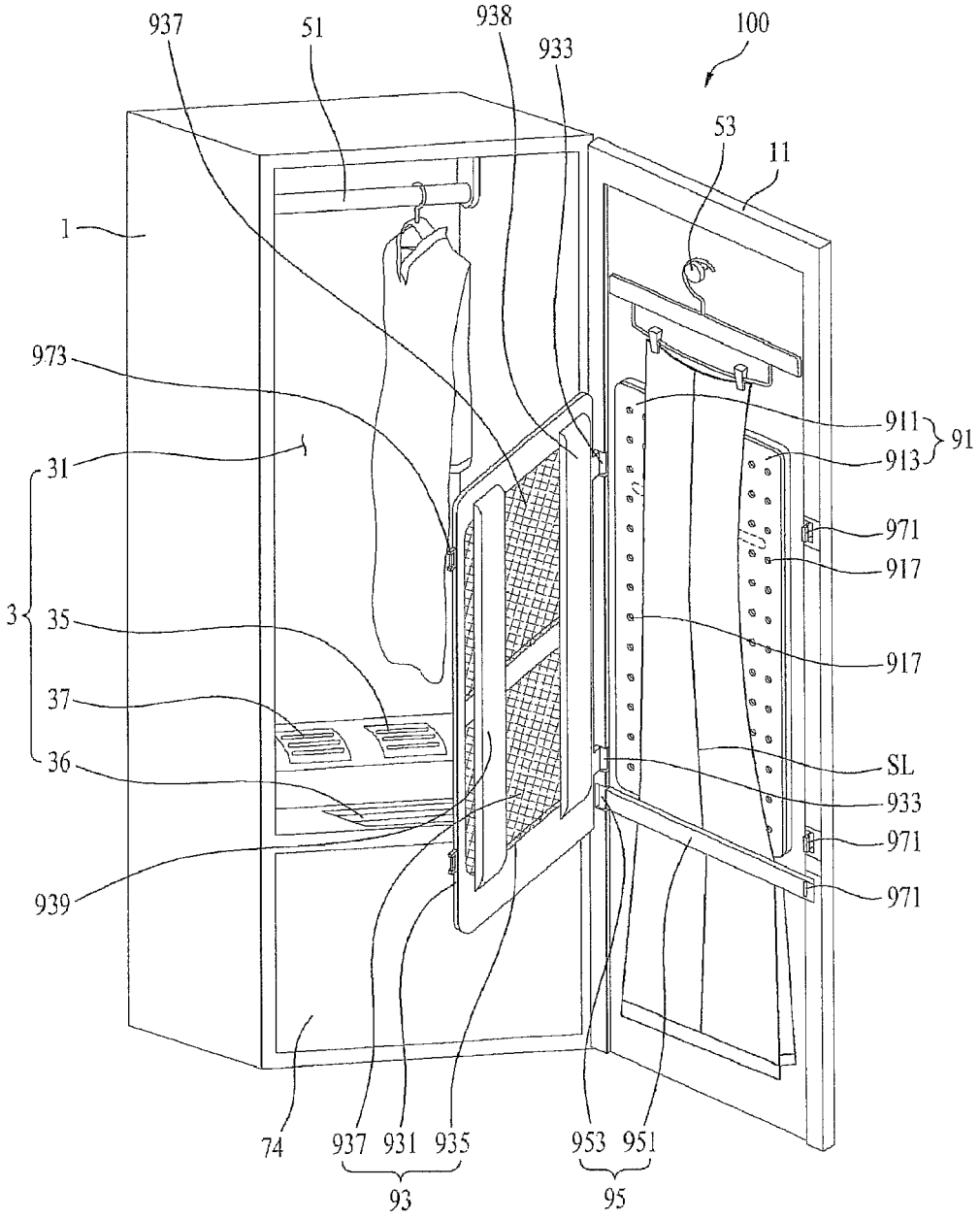

The presser 9 having the above-described structure may be operated as shown in FIG. 4.

A user may fix a laundry item, such as trousers, having a crease preformed thereon, on a hanger and connect a hook of the hanger to the second laundry support bar 53 provided at the door 11 to position the laundry at the support device 91. The user may adjust the position of the laundry such that a sewing line SL, or seam, of the laundry is positioned in the space S defined between the first support plate 911 and the second support plate 913.

After the laundry is supported by the support device 91, the user rotates the body 931 of the compression device 93 toward the support unit 91 such that the protrusion(s) 971 provided at the door 11 are inserted into the receiving grooves 973 provided at the body 931 to fix the body 93 to the door 11.

In a case in which the laundry has a crease preformed thereon, the user may adjust the position of the laundry such that the crease may be compressed at interfaces between the body 931 and the respective support plates 911 and 913. In a case in which the user wishes to form a new crease on the laundry although the laundry has no crease preformed thereon, the user may position the laundry at the interfaces between the body 931 and the respective support plates 911 and 913 such that the crease can be formed at a desired position.

After the body 931 of the compression device 93 is fixed to the door 11 by the attaching and detaching device 971 and 973, the user closes the door 11 to close the receiving space 31 and then operates at least one of the air supply device 71 or the moisture supply device 72. Heated air or steam supplied into the receiving space 31 through the air supply device 71 or the moisture supply device 72 is supplied to the laundry through the mesh 937 provided at the compression device 93. The heated air or steam supplied to the laundry moves to the receiving space 31 via the presser receiving groove 13 through the through holes 917 provided at the respective support plates 911 and 913.

When the heated air or steam is supplied to the laundry fixed by the presser 9, wrinkles are removed from the laundry and the crease of the laundry positioned at an interface between the support device 91 and the compression device 93 may be set.

Consequently, a laundry treating apparatus 100, as embodied and broadly described herein, may form a crease on laundry as well as deodorize the laundry and remove wrinkles from the laundry.

In certain embodiments, the compression device 93 may further include a compression plate to more easily form the crease of the laundry positioned at the interface between the support device 91 and the compression device 93. The compression plate may include a first compression plate 938 and a second compression plate 939 fixed to the body 931 and extending in a longitudinal direction of the laundry. The edge of the first compression plate 938 may be, for example, parallel to that of the first support plate 911 and the edge of the second support plate 913 maybe, for example, parallel to that of the second compression plate 939.

In certain embodiments, the presser 9 may also include a fixing device 95 rotatably provided at the door 11 to more easily fix the position of the laundry supported by the support device 91. The fixing device 95 may include a fixing plate 951 formed in the shape of a bar or a board and a fixing plate hinge 953 to rotatably fix the fixing plate 951 to the inner surface of the door 11. In a case in which the second laundry support bar 53 is provided above the support device 91, the fixing device 95 may be positioned under the support device 91.

Figure 5A:
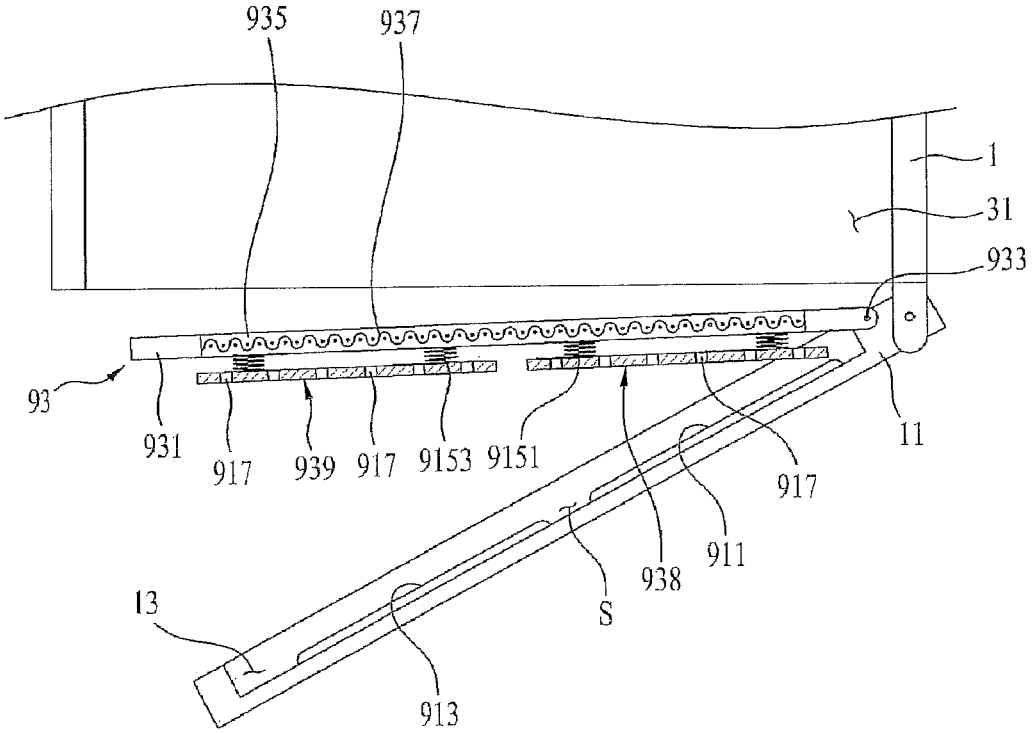
FIGS. 5A and 5B are top and side views of a presser according to another embodiment.

FIG. 5A is a top view of a presser 9 provided in the laundry treating apparatus 100 according to another embodiment as broadly described herein. The presser 9 shown in FIG. 5A includes an elastic member provided at a compression device 93 is different from that of the elastic member provided at the presser shown in FIGS. 1 to 4.

More specifically, the presser 9 according to this embodiment also includes a support device 91 provided in the presser receiving groove 13 and a compression device 93 rotatably provided at the door 11 to compress laundry toward the support device 91. The support device 91 includes a first support plate 911 and a second support plate 913 provided in the presser receiving groove 13, spaced apart from each other by a predetermined distance S.

The compression device 93 may include a body 931 rotatably provided at the inner surface of the door 11, a body through hole 935 formed through the body 931, and a mesh 937 fixed in the body through hole 935.

The compression device 93 may also include a first compression plate 938 supported at the body 931 by a first elastic body 9151 and a second compression plate 939 supported at the body 931 by a second elastic body 9153. In this case, the first compression plate 938 and the second compression plate 939 may further include through holes 917 formed through the respective compression plates 938 and 939 such that steam or heated air supplied through the mesh 937 may flow to the support device 91.

A presser 9 shown in 5B has essentially the same basic structure as the presser 9 shown in FIG. 5A. However, in the presser 9 shown in FIG. 5B, a first compression plate 938 and a second compression plate 939 are connected to a body 931 via a link structure.

That is, the first compression plate 938 may be connected to the body 931 via a first link 9155 and the second compression plate 939 may be connected to the body 931 via a second link 9157.

In certain embodiments, elastic bodies, such as springs, may also be provided at interfaces between the respective links 9155 and 9157 and the respective compression plates 938 and 939, and at interfaces between the respective links 9155 and 9157 and the body 931, such that the respective links 9155 and 9157 may return to initial positions thereof when the body 931 is separated from a support device 91.

The respective compression plates 938 and 939 may be connected to the body 931 via the respective links 9155 and 9157 to prevent wrinkles from being formed on laundry due to the respective compression plates 938 and 939 when the body 931 is rotated toward the support device 91.

In the embodiment shown in FIG. 1 or 5A, the respective compression plates 938 and 939 may move in the width direction of the door 11 when the body 931 is coupled to the respective support plates 911 and 913. In a case in which the body 931 is coupled to the respective support plates 911 and 913, unnecessary wrinkles or creases may be formed on the laundry.

Figure 5B:
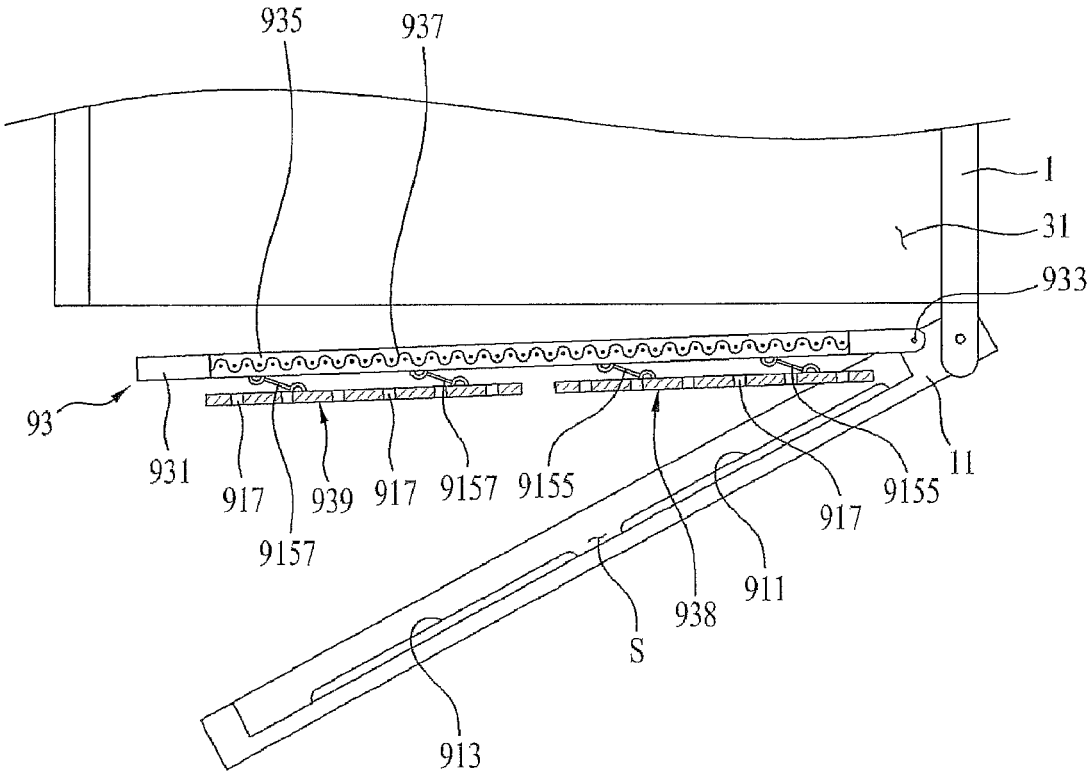

In the presser shown in FIG. 5B, on the other hand, the respective compression plates 938 and 939 only move toward the surface of the body 931 when the body 931 is coupled to the respective support plates 911 and 913. As a result, wrinkles or creases are prevented from being formed on the laundry due to respective compression plates 938 and 939. To this end, the respective links 9155 and 9157 may be provided between the respective compression plates 938 and 939 and the body 931, inclined at a predetermined angle to connect the respective compression plates 938 and 939 to the body 931.

A laundry treating apparatus is provided that is capable of easily drying, deodorizing, and sterilizing laundry and easily removing wrinkles from the laundry.

A laundry apparatus, as embodied and broadly described herein, may include a cabinet having a receiving space to receive laundry, a supply unit to supply at least one selected from between air and moisture into the receiving space, and a presser including a support unit provided in the receiving space to support the laundry and a compression unit to compress the laundry supported by the support unit to form a crease on the laundry.

The support unit may be fixed to an inner circumferential surface of the receiving space, and the compression unit may be rotatably provided at the inner circumferential surface of the receiving space.

The laundry treating apparatus may also include a door rotatably provided at the cabinet to open and close the receiving space, wherein the presser may be provided at an inner circumferential surface of the door facing the receiving space.

The support unit may be fixed to the inner circumferential surface of the door, and the compression unit may be rotatably fixed to the inner circumferential surface of the door.

The compression unit may include a body rotatably fixed to the inner circumferential surface of the door to compress the laundry support by the support unit, and a body through hole formed through the body.

The compression unit may also include a mesh provided in the body through hole.

The compression unit may also include a compression plate provided at the body to compress the crease of the laundry toward the support unit.

The compression plate may also include a first compression plate and a second compression plate fixed to the body while being spaced apart from each other by a predetermined distance.

The door may also include a presser receiving groove depressed in an inner circumferential portion thereof, and the support unit may include a support plate disposed in the presser receiving groove.

The support unit may also include an elastic member provided in the presser receiving groove to elastically support the support plate.

The support plate may include a first support plate disposed in the presser receiving groove to support the laundry in a longitudinal direction and a second support plate disposed in the presser receiving groove to support the laundry in the longitudinal direction, the second support plate being spaced apart from the first support plate by a predetermined distance, and the elastic member may include a first elastic body to support the first support plate and a second elastic body to support the second support plate.

The first support plate and the second support plate may also include through holes formed through the respective support plates, and the first support plate and the second support plate may be spaced apart from the presser receiving groove by a predetermined distance due to the first elastic body and the second elastic body.

The door may also include a laundry support bar to which one end of the laundry is fixed, and the presser may further include a fixing unit to fix the other end of the laundry supported by the laundry support bar to the door.

The laundry support bar may be positioned above the support unit, and the fixing unit may be positioned under the support unit.

The laundry treating apparatus may also include a machinery compartment provided under the receiving space in a state in which the machinery compartment is isolated from the receiving space, wherein the supply unit may include an air supply unit provided in the machinery compartment to supply heated air to the receiving space and a moisture supply unit provided in the machinery compartment to supply steam to the receiving space.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

[1. A laundry treating apparatus, comprising:

a cabinet having a receiving space to receive laundry;

a door rotatably coupled to the cabinet to open and close an access opening of the receiving space;

a supply device that supplies at least one of air or moisture into the receiving space; and a presser provided at an inner surface of the door, facing an interior of the receiving space in a closed position of the door, the presser including a support device configured to support the laundry in the receiving space and a compression device configured to compress the laundry between the compression device and the support device, wherein the support device is fixed to the inner surface of the door, and the compression device is rotatably coupled to the inner surface of the door so as to rotate relative to the support device and selectively extend across the support device.]

[2. The apparatus of claim 1, wherein the compression device includes:

a body rotatably coupled to an inner circumferential surface of the door and configured to rotate to a position against the support device so as to compress the laundry supported by the support device between the support device and the compression device; and a body through hole formed through the body.]

[3. The apparatus of claim 2, wherein the compression device further includes a mesh panel provided in the body through hole.]

[4. The apparatus of claim 3, wherein the compression device further includes at least one compression plate provided at the body and configured to compress a corresponding portion of the laundry toward the support device.]

[5. The apparatus of claim 4, wherein the at least one compression plate includes:

a first compression plate fixed to the body; and a second compression plate fixed to the body, spaced apart from the first compression plate by a predetermined distance.]

[6. The apparatus of claim 1, wherein the door further includes a presser receiving groove formed as a recess in the inner surface of the door, and the support device includes at least one support plate provided in the presser receiving groove.]

[7. The apparatus of claim 6, wherein the support device further includes at least one elastic device provided in the presser receiving groove to elastically support the at least one support plate.]

[8. The apparatus of claim 7, wherein the at least one support plate includes:

a first support plate provided in a longitudinal direction in the presser receiving groove and configured to support the laundry; and a second support plate provided in the longitudinal direction in the presser receiving groove and configured to support the laundry, the second support plate being spaced apart from the first support plate by a predetermined distance, and wherein the at least one elastic device includes:

a first elastic device elastically supporting the first support plate in the presser receiving groove; and a second elastic device elastically supporting the second support plate in the presser receiving groove.]

[9. The apparatus of claim 8, wherein the first support plate and the second support plate are each spaced apart from the presser receiving groove by a predetermined distance by the first elastic device and the second elastic device, respectively, and the first and second support plates each include at least one through hole extending therethrough.]

[10. The apparatus of claim 9, wherein a through hole formed in a body of the compression device guides heated air or moisture generated by the supply device from the receiving space to the laundry supported on the supporting device, and through holes in the support device guide the heated air or moisture which has passed through the laundry back to the supply device.]

[11. The apparatus of claim 6, wherein the door further includes a laundry support bar configured to have a first end portion of the laundry fixed thereto, and the presser includes a fixing device configured to have a second end portion of the laundry fixed thereto such that the laundry is held in position between the support device and the compression device by the laundry support bar and the fixing device.]

[12. The apparatus of claim 11, wherein the laundry support bar is positioned above the support device on the inner surface of the door, and the fixing device is positioned below the support device on the inner surface of the door.]

[13. The apparatus of claim 1, further including:

a machinery compartment provided under the receiving space, the machinery compartment being partitioned from the receiving space, wherein the supply device includes an air supply device provided in the machinery compartment to supply heated air to the receiving space and a moisture supply device provided in the machinery compartment to supply steam to the receiving space.]

[14. A laundry treating apparatus, comprising:

a cabinet having a receiving space formed therein;

a machinery compartment formed in the cabinet, below the receiving space and partitioned from the cabinet;

a supply device provided in the machinery cabinet and configured to supply at least one of heated air or moisture into the receiving space;

a door rotatably coupled to the cabinet so as to selectively open and close an access opening into the receiving space; and a presser provided on an interior wall defining the receiving space, wherein the presser includes:

a support device provided on the interior wall and configured to support a laundry item thereon; and a compression device rotatably coupled to the interior wall, at a position corresponding to the support device, and configured to rotate relative to the support device so as to extend across the support device and compress the laundry item between the support device and the compression device, wherein the compression device includes:

a body formed as a frame that is rotatably coupled to the interior wall, the frame of the body defining an opening; and a body through hole formed through the body.]

[15. The apparatus of claim 14, wherein the support device includes:

first and second support plates positioned side by side, with a space therebetween, in a presser receiving groove formed as a recess in the interior wall;

a first elastic device provided between the first support plate and the presser receiving groove and a second elastic device provided between the second support plate and the presser receiving groove, the first and second elastic devices elastically supporting the first and second support plates and maintaining a predetermined gap between the first and second support plates and the presser receiving groove, respectively; and a plurality of first through holes formed in the first support plate and a plurality of second through holes formed in the second support plate.]

[16. The apparatus of claim 15, wherein the compression device further includes:

a mesh panel provided in the opening formed in the body, and a first compression plate and a second compression plate coupled to the body, positioned side by side and spaced apart from each other a predetermined distance, wherein the compression device is rotatably coupled to the interior wall by a hinge provided at a first lateral edge of the body, and wherein the compression device and the support device are selectively coupled against each other by an attaching device provided at a second lateral edge of the body of the compression device, opposite the first lateral edge thereof.]

[17. The apparatus of claim 16, wherein the attaching device includes a plurality of protrusions formed on one of the body of the compression device or the interior wall of the receiving space, and a corresponding plurality of receiving grooves formed in the other of the body of the body of the compression device or the interior wall of the receiving space, wherein the plurality of protrusions are respectively received in the plurality of receiving grooves to fix the compression device against the support device and compress the laundry item received therebetween, and the plurality of protrusions are released from the plurality of receiving grooves to rotate the compression device away from the support device.]

[18. The apparatus of claim 16, wherein openings formed in the mesh panel of the compression device guide the at least one of heated air or moisture generated by the supply device to the laundry item compressed between the compression device and the support device, and the plurality of first through holes and the plurality of second through holes respectively formed in the first and second support plates of the support device guide the at least one of heated air or moisture which has passed through the laundry item into the presser receiving groove for discharge.]

*19. A laundry treating apparatus, comprising:*

*a cabinet having a receiving space to receive laundry;*

*a door rotatably coupled to the cabinet to open and close an access opening of the receiving space;*

*a supply device that supplies at least one of air or moisture into the receiving space; and*

*a laundry press provided at an inner surface of the door and facing an interior of the receiving space in a closed position of the door, the laundry press including a support and a compression device configured to compress the laundry against the support,*

*wherein the support is mounted on the inner surface of the door, and the compression device is rotatably coupled to the inner surface of the door so as to rotate relative to the support, and*

*wherein the compression device includes an inner surface facing the support and an outer surface facing the receiving space, the inner surface comprising a plurality of protruding surfaces configured to press against the support when the compression device is in a closed position.*

*20. The laundry treating apparatus of claim 19, wherein the compression device further includes a body provided rotatably relative to the support, and*

*wherein the plurality of protruding surfaces includes:*

*a first protruding surface that is provided on the body and extends vertically and is configured to face a front surface of the support, and*

*a second protruding surface that is provided on the body and extends vertically and is configured to face the front surface of the support, the second protruding surface being provided a prescribed distance laterally from the first protruding surface.*

*21. The laundry treating apparatus of claim 20, wherein a body through hole is provided on the body, and the body through hole is configured to allow the support to communicate with the receiving space.*

*22. The laundry treating apparatus of claim 21, wherein each of the first protruding surface and the second protruding surface extends above and below the body through hole vertically.*

*23. The laundry treating apparatus of claim 22, wherein a sew line of the laundry is located between the first protruding surface and the second protruding surface when the compression device presses the laundry against the support.*

*24. A laundry treating apparatus, comprising:*

*a cabinet having a receiving space to receive laundry;*

*a door rotatably coupled to the cabinet to open and close an access opening of the receiving space;*

*a supply device that supplies at least one of air or moisture into the receiving space; and*

*a laundry press provided at an inner surface of the door and facing an interior of the receiving space in a closed position of the door, the laundry press including a support and a compression device configured to compress the laundry against the support,*

*wherein the support is mounted on the inner surface of the door, and the compression device is rotatably coupled to the inner surface of the door so as to rotate relative to the support, and*

*wherein the compression device includes:*

*a first compression plate vertically extending;*

*a second compression plate provided a prescribed distance from the first plate and vertically extending; and*

*a body connecting the first compression plate and the second compression plate to simultaneously rotate with the first compression plate and the second compression plate.*

*25. The laundry treating apparatus of claim 24, wherein the compression device further includes a body through hole located below an upper end of the body and above a lower end of the body.*

*26. The laundry treating apparatus of claim 24, wherein the body extends a predetermined length in a direction so as to connect the first compression plate and the second compression plate.*

*27. The laundry treating apparatus of claim 26, wherein at least one of the first plate or the second plate is provided on a surface of the body that faces the support when the compression device is in a closed position.*

*28. A laundry treating apparatus, comprising:*

*a cabinet having a receiving space to receive laundry;*

*a door rotatably coupled to the cabinet to open and close an access opening of the receiving space;*

*a supply device that supplies at least one of air or moisture into the receiving space; and*

*a laundry press provided at an inner surface of the door and facing an interior of the receiving space in a closed position of the door, the laundry press including a support and a compression device configured to compress the laundry against the support,*

*wherein the support is mounted on the inner surface of the door, and the compression device is rotatably coupled to the inner surface of the door so as to rotate relative to the support, and*

*wherein the compression device includes a frame having at least one through-hole.*

*29. The laundry treating apparatus of claim 28, wherein the compression device includes*

*a first compression plate and a second compression plate provided on the frame to extend vertically, the first compression plate and the second compression plate being spaced apart from each other and provided adjacent to opposite sides of the at least one through-hole.*

*30. The laundry treating apparatus of claim 29, wherein the at least one through-hole is provided between an upper portion and a lower portion of the frame.*

*31. The laundry treating apparatus of claim 29, wherein the laundry press is configured such that, when the compression device is in a closed position, a prescribed region of the laundry is not pressed by the laundry press.*

*32. The laundry treating apparatus of claim 31, wherein a length of the frame is greater than a length of the support such that the compression device extends below a bottom end of the support.*

* * * * *